April 26, 1927.  J. C. BLAIR  1,626,382
FORMING SHEET GLASS
Filed Feb. 18, 1924
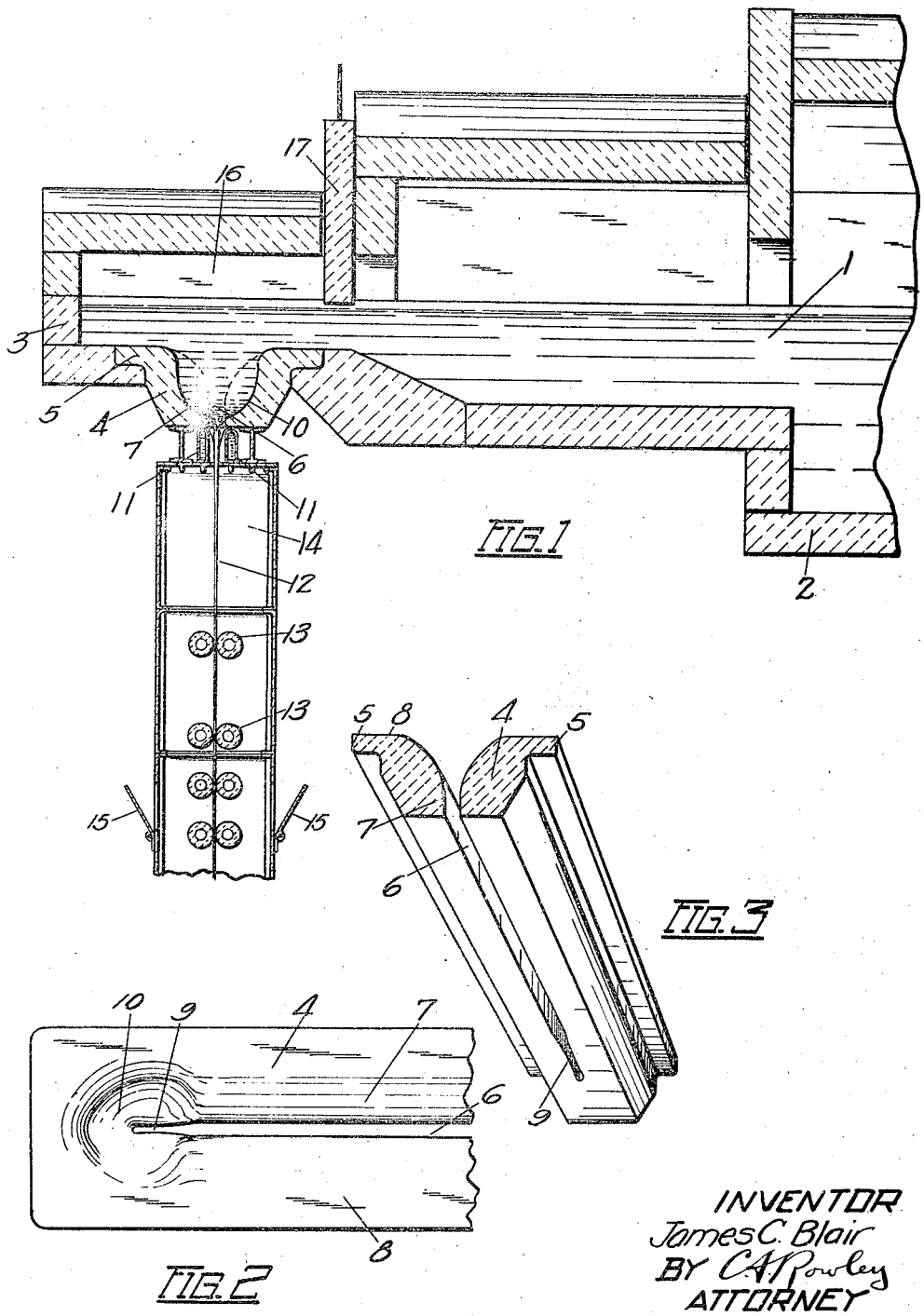
INVENTOR
James C. Blair
BY C A Rowley
ATTORNEY Patented Apr. 26, 1927.

1,626,382

UNITED STATES PATENT OFFICE.

JAMES C. BLAIR, OF TOLEDO, OHIO, ASSIGNOR TO THE LIBBEY-OWENS SHEET GLASS COMPANY, OF TOLEDO, OHIO, A CORPORATION OF OHIO.

FORMING SHEET GLASS.

Application filed February 18, 1924. Serial No. 693,501.

This invention relates to improvements in the art of producing sheet glass, and more particularly to an improved method and apparatus for forming the sheet by flowing and drawing the molten glass downwardly through an elongated orifice in the bottom of the container.

According to this invention the slot or orifice through which the molten glass flows downwardly is considerably wider than the thickness of the glass sheet which is to be formed. The slot is of a peculiar configuration, varying at different points in its length, both in depth and thickness, as will be described in detail hereinafter. The molten stream flowing downwardly through this slot is cooled or chilled by a pair of water-cooled heat-absorbing members arranged closely adjacent the sides of the emerging stream, the glass thus being converted into a plastic mass which is stretched downwardly into sheet form by its own weight assisted by suitable drawing and guiding means which engage the formed sheet some distance below the orifice. Immediately below the coolers, the formed sheet passes into a closed annealing chamber wherein the sheet is tempered and annealed. This chamber is heated principally by the heat transmitted from the glass sheet itself.

The objects and advantages of this invention will be more clearly understood from the following detailed description of one approved form of the apparatus.

In the accompanying drawings:

Fig. 1 is a longitudinal vertical section through the apparatus.

Fig. 2 is a plan view of one end of the forming block.

Fig. 3 is a perspective of a portion of this forming member, looking at the bottom thereof.

The molten glass 1 is produced in the tank or furnace 2 from which it flows into the relatively shallow tank or flowing chamber 3. The main purpose of the shallow tank 3 is to reduce the head of glass above the flowing slot hereinafter described, and to facilitate the temperature control of the body of refined molten glass which supplies the sheet-forming mechanism.

In the bottom of tank 3 is arranged the forming member or block 4, constructed of a suitable refractory material. At its upper edges this block has supporting flanges 5 which rest in suitable recesses in the surrounding blocks of the furnace. Extending vertically through the central portion of the block is the elongated longitudinal slot through which the molten glass flows to form the sheet.

The central portion 6 of this slot is considerably wider than the thickness of the sheet to be produced and the walls 7 of the slot extend vertically upward for several inches and then curve outwardly until they merge with the upper surface 8 of the member. The short end portions 9 of the slot are narrower than the central portion 6, although these narrow ends are somewhat wider than the thickness of the glass sheet to be produced. End slots 9 are quite shallow, the block 4 being hollowed out directly above these slots as shown at 10 to provide a large body of relatively hot supplying glass directly above these narrow sheet-edge-forming slots.

Immediately below the slot a pair of water-cooled shields 11 are arranged quite close to the edges of the slot so that they will absorb a considerable portion of the heat from the emerging glass and reduce it to such a stiff and plastic condition that it may be drawn downwardly into the form of sheet 12 by the weight of the formed sheet assisted by the pairs of driven supporting and guiding rollers 13, positioned a considerable distance below the slot.

It will be noted that the main body of molten glass which forms the central portion of the sheet will flow relatively slowly downward through the wide portion 6 of the slot, which portion has rather long high walls providing considerable frictional resistance and clinging area for the sides of the streams. The smaller mass of glass flowing through the narrow ends of the slot must flow downwardly at a more rapid rate to supply the sheet edges, and to provide for this more rapid flowing rate, as well as to prevent excessive cooling at the ends of the slot and the formation of "dog-metal" or devitrified glass, the large bowl-shaped receptacles 10 are provided directly above the narrow slots 9. The comparatively large mass of hot glass in these bowls 10 will prevent an undue chilling of the glass in the slot ends as well as provide an adequate supply for the faster drawing rate through these narrow portions of slot.

It has been found that when glass is drawn or flowed through a slotted orifice of equal width from end to end, the sheet will be much thicker adjacent its edges, largely due to the excessive chilling of these portions of the glass stream. To prevent this the slot here used is made narrower at its ends to reduce the thickness of the sheet edges to approximately that of the remaining portion of the sheet. The narrow slots 9 perform the additional function of supplying an excess drag or tension in the edge portions of the sheet, this tension serving to hold the sheet to width and materially assist in forming a flatter and more even sheet of glass.

The glass sheet 12 which is drawn downwardly from the plastic mass of glass emerging through the slotted orifice between coolers 11, passes almost immediately into the closed annealing chamber 14 which entirely surrounds the sheet and drawing mechanism for a considerable distance below the cooling zone. This chamber 14 is of comparatively small cross-section and is heated almost entirely by the heat thrown out from the glass sheet 12. As the sheet passes downwardly through the gradually cooling atmosphere in this chamber 14, it will be annealed, and after passing out at the lower end of this chamber it may be divided into suitable sheet sections in any approved manner. The chamber 14 also prevents access to the forming glass sheet 12 of dirt and disturbing air currents. Temperature regulating valves or dampers are located in the lower portions of the side walls of chamber 14, a pair of these in open position being indicated at 15.

It will be understood that suitable heating means are provided for the glass in the tank, and particularly in and around the sheet forming extension 3 thereof, to maintain the molten glass at the proper working temperature. These heating means have been omitted from the drawings for the sake of clearness. The heating chamber 16 above the tank 3 may be cut off from the remainder of the tank by a suitably adjustable gate or shear-cake 17, and if desired this gate or an equivalent member may be lowered somewhat into the stream of molten glass 1 to control to some extent the glass level and keep back the surface flow.

Claims:

1. The method of forming sheet glass, wherein glass flows downwardly through an elongated orifice, whose end portions are narrower than the central portion.

2. The method of forming sheet glass, wherein glass flows downwardly from a container through a passage having restricted end portions.

3. The method of forming sheet glass, consisting in flowing glass downwardly from a container through a passage having restricted end portions, and providing a freer flowing supply of glass above the restricted ends than above the wider central portion of the passage.

4. The method of forming sheet glass, wherein glass flows downwardly from a pool of molten glass in a wide thick stream, having relatively narrow edge portions.

5. The method of forming sheet glass, wherein glass flows downwardly from a pool of molten glass in a wide thick stream, having relatively narrow edge portions, the narrow portions of the stream being in closer communication with the molten pool than the wider central portion.

6. The method of forming sheet glass, consisting in flowing glass downwardly from a pool of molten glass in a wide thick stream, having relatively narrow edge portions, chilling the stream and then drawing the glass downwardly in sheet form through a closed chamber.

7. The method of forming sheet glass, consisting in flowing glass downwardly from a pool of molten glass in a wide thick stream, having relatively narrow edge portions, the narrow portions of the stream being in closer communication with the molten pool than the wider central portion, chilling the stream and then drawing the glass downwardly in sheet form through a closed chamber.

8. In an apparatus for producing sheet glass, a container for molten glass comprising a member in the bottom thereof having an elongated vertical slot through which the molten glass flows to form the sheet, the slot being narrower at its ends than at its central portion.

9. In an apparatus for producing sheet glass, a container for molten glass comprising a member in the bottom thereof having an elongated vertical slot through which the molten glass flows to form the sheet, the slot being deeper at its central portion than adjacent its ends.

10. In an apparatus for producing sheet glass, a container for molten glass comprising a member in the bottom thereof having an elongated vertical slot through which the molten glass flows to form the sheet, the slot being narrow and shallow at its ends, and wider and deeper at the central portion.

11. In an apparatus for producing sheet glass, a container for molten glass comprising a member in the bottom thereof having an elongated vertical slot through which the molten glass flows to form the sheet, the slot being relatively restricted adjacent its ends.

12. In an apparatus for producing sheet glass, a container for molten glass comprising a member in the bottom thereof having an elongated vertical slot through which the molten glass flows to form the sheet, the slot being narrower at its ends than at its central portion, means for cooling the glass as it emerges from the slot, and means for drawing the glass downwardly in sheet form.

13. In an apparatus for producing sheet glass, a container for molten glass comprising a member in the bottom thereof having an elongated vertical slot through which the molten glass flows to form the sheet, the slot being narrower at its ends than at its central portion, means for cooling the glass as it emerges from the slot, and a closed annealing chamber through which the glass passes downwardly.

14. In an apparatus for producing sheet glass, a container for molten glass comprising a member in the bottom thereof having an elongated vertical slot through which the molten glass flows to form the sheet, the slot being narrower at its ends than at its central portion, means for cooling the glass as it emerges from the slot, means for drawing the glass downwardly in sheet form, and an annealing chamber enclosing the sheet and drawing means.

15. In an apparatus for producing sheet glass, a container for molten glass having an elongated slot in its bottom through which the glass flows, cooling means at the sides of the stream as it emerges from the slot, and a closed annealing chamber through which the glass is drawn in sheet form.

16. In an apparatus for producing sheet glass, a container for molten glass having an elongated slot in its bottom through which the glass flows, cooling means at the sides of the stream as it emerges from the slot, sheet-drawing means below the coolers, and an annealing chamber enclosing the sheet and drawing means.

Signed at Toledo, in the county of Lucas and State of Ohio, this 16th day of February, 1924.

JAMES C. BLAIR.